(No Model.)
J. P. SMITH.
VENTILATOR FOR FRUIT RECEPTACLES.
No. 469,983.          Patented Mar. 1, 1892.
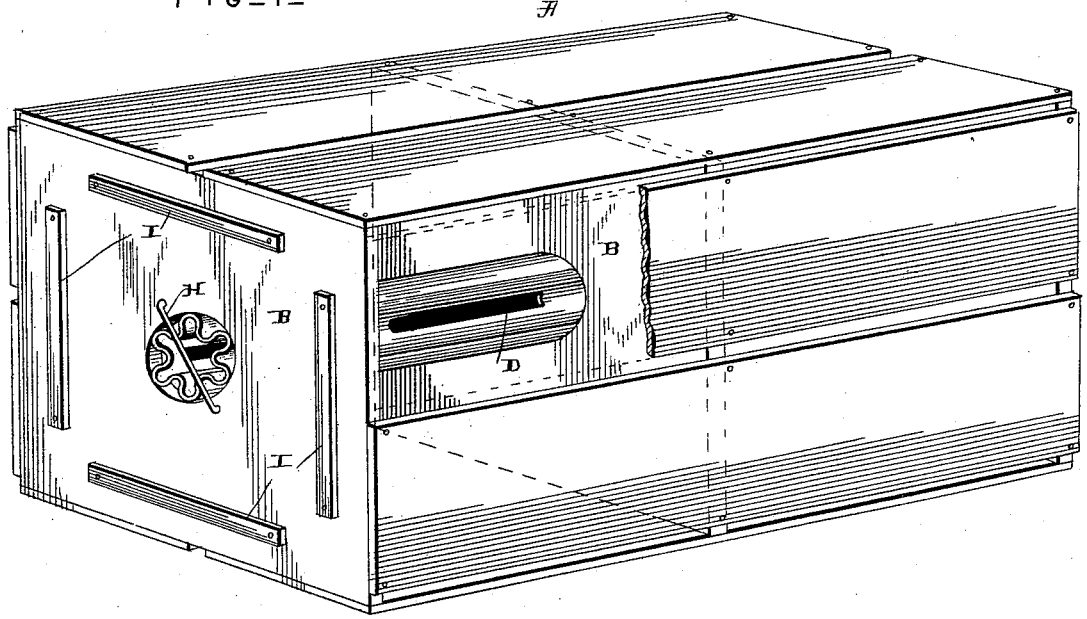
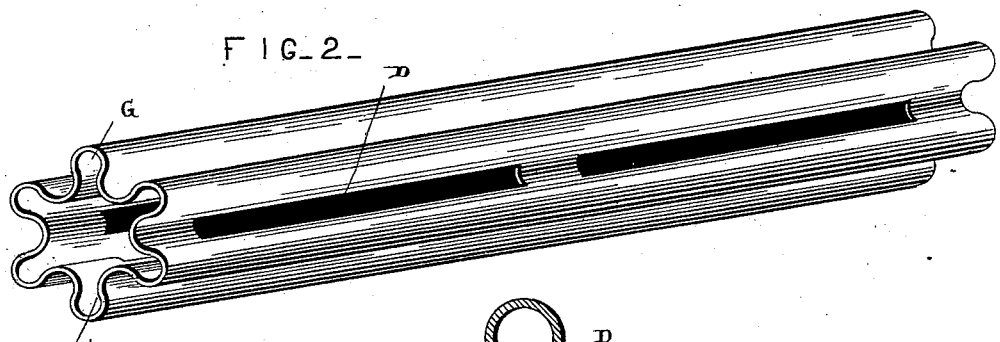
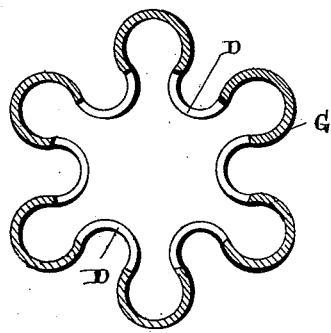
WITNESSES
Geo. E. Frech.
R. H. Fitzgerald
INVENTOR
James P. Smith
by Lehmann & Pattison
attys

UNITED STATES PATENT OFFICE.

JAMES PATRICK SMITH, OF PITTSBURG, PENNSYLVANIA.

VENTILATOR FOR FRUIT-RECEPTACLES.

SPECIFICATION forming part of Letters Patent No. 469,983, dated March 1, 1892.

Application filed September 26, 1891. Serial No. 406,958. (No model.)

*To all whom it may concern:*

Be it known that I, JAMES PATRICK SMITH, of Pittsburg, in the county of Allegheny and State of Pennsylvania, have invented certain new and useful Improvements in Ventilators for Fruit-Receptacles; and I do hereby declare the following to be a full, clear, and exact description of the invention, such as will enable others skilled in the art to which it pertains to make and use it, reference being had to the accompanying drawings, which form part of this specification.

My invention relates to an improvement in ventilators for fruit-boxes of all descriptions and barrels; and it consists in the novel construction and arrangements of parts, which will be fully described hereinafter, and particularly referred to in the claim.

The object of my invention is to provide a ventilator adapted to be applied to the center of fruit-boxes of all descriptions, and also to barrels, whereby a free circulation of air is admitted to the fruit at the center and decay thereof prevented for the want of a circulation of air, as is the case where no ventilator or other means is provided for feeding air to the fruit at the center of the box or barrel.

In the drawings, Figure 1 is a perspective view of a box showing my invention applied thereto, the side of the box being shown partly in section. Fig. 2 is an enlarged detached perspective view of the ventilator, showing its specific construction. Fig. 3 is a right section of ventilator shown in Fig. 2.

A indicates a lemon, orange, or other fruit box, which has its ends and center piece B provided with a perforation through which my ventilator is designed to pass and to be supported thereby.

This ventilator consists of a corrugated tube, as shown, which is cut out between the extended flutes of the corrugations to form the air inlet and outlet openings D, and the webs G, which connect and hold the corrugations, as shown. These webs are preferably made opposite each other, so as to form a circle; but it will be understood that they may be placed staggering or in any other relative relation desired without departing from the spirit of my invention, as will be readily understood, the object of them being to connect the corrugations.

The object of making the tube corrugated instead of round and perforated is to prevent the lemons, oranges, or other fruit from covering up the perforations or other openings by resting against them, as they would do if made round and provided with perforations. By making the tube corrugated as here shown, however, the fruit will not get down between the extending flutes of the corrugations to stop up the openings or slits D made between them, as will be readily seen; also, by making the tube corrugated the air will pass in the box and around the fruit through the openings formed between the exterior of the tube and the openings made in the end pieces, as shown in Fig. 1. In this manner a more perfect ventilation is maintained.

I here show the box with one central piece B, which supports the central portion of the tube; but in a long box two or more pieces can be placed in the box for supporting the tube, or if the tube is made strong enough it can be made to extend from end to end of the box and be supported in the ends thereof only. So, also, the tube can be made long enough to extend entirely through the box, or it can be made in sections and have the inner ends of the sections supported upon the intermediate pieces B, as desired.

I do not desire to limit myself to any particular material out of which the tube is to be made, as it can be made of heavy pasteboard, or of sheet metal of any desired thickness.

The tubes are held in place against endwise movement by means of the wires H, which extend across the ends of the tubes and have their ends bent and driven in the outer sides of the end pieces B, as shown in Fig. 1.

In order to prevent the ends of the tubes being stopped up when the boxes are placed in a pile with their ends together, I provide the ends of the boxes with the thin strips I, which prevent them from coming immediately together and thus stopping up the openings in the ends of the tubes. In this manner the boxes are held separated a short distance and a free circulation of air always maintained.

While I here show my ventilator attached to a box, it will be readily understood that it can be readily attached to a barrel or other fruit-receptacle and the result be the same.

By means of the above-described construction I am enabled to produce a cheap and simple ventilator which can be applied to fruit-boxes of all descriptions and to barrels and which will insure a free circulation of air at all times to the fruit at the center of the receptacle to which it is applied.

Having thus described my invention, I claim—

The combination, with a receptacle having openings, of a ventilator which passes through the openings, consisting of a continuous sheet of material bent into the form of a tube having external longitudinal ridges forming corrugations, the material having openings in the longitudinal cavities formed by the ridges, substantially as set forth.

In testimony whereof I affix my signature in presence of two witnesses.

JAMES PATRICK SMITH.

Witnesses:
H. P. McCULLUGH,
PATRICK SMITH.